United States Patent
Lindbom et al.

(10) Patent No.: US 8,639,241 B2
(45) Date of Patent: Jan. 28, 2014

(54) METHOD AND ARRANGEMENT IN A TELECOMMUNICATION SYSTEM

(75) Inventors: Lars Lindbom, Karlstad (SE); Johan Mikael Bergman, Stockholm (SE); Dirk Gerstenberger, Stockholm (SE); Muhammad Ali Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 364 days.

(21) Appl. No.: 12/680,272

(22) PCT Filed: Apr. 30, 2008

(86) PCT No.: PCT/EP2008/003535
§ 371 (c)(1),
(2), (4) Date: Mar. 26, 2010

(87) PCT Pub. No.: WO2009/043392
PCT Pub. Date: Apr. 9, 2009

(65) Prior Publication Data
US 2010/0311411 A1     Dec. 9, 2010

Related U.S. Application Data

(60) Provisional application No. 60/976,885, filed on Oct. 2, 2007.

(51) Int. Cl.
*H04W 24/00* (2009.01)

(52) U.S. Cl.
USPC ......... 455/424; 455/423; 455/425; 455/67.11

(58) Field of Classification Search
USPC .............. 455/423–425, 67.11, 67.14–67.16, 455/115.1–115.4, 226.1–226.4
See application file for complete search history.

(56) References Cited

U.S. PATENT DOCUMENTS

| | | | |
|---|---|---|---|
| 5,459,731 A | 10/1995 | Brief et al. | |
| 2002/0181634 A1 | 12/2002 | Yang et al. | |
| 2004/0157610 A1 | 8/2004 | Black et al. | |
| 2008/0008212 A1* | 1/2008 | Wang et al. | 370/503 |

FOREIGN PATENT DOCUMENTS

| | | |
|---|---|---|
| WO | 2005/109672 A1 | 11/2005 |
| WO | 2006/086359 A2 | 8/2006 |
| WO | 2006/096870 A1 | 9/2006 |

* cited by examiner

*Primary Examiner* — Wayne Cai
(74) *Attorney, Agent, or Firm* — Coats & Bennett, PLLC (57) ABSTRACT

A user equipment, in a cellular telecommunication system having a plurality of downlink physical channels, detects radio link problems using a subset of said physical channels, where said subset is dynamically adjustable depending upon which channels are available at a particular instant.

19 Claims, 4 Drawing Sheets

METHOD AND ARRANGEMENT IN A TELECOMMUNICATION SYSTEM

FIELD OF THE INVENTION

The present invention relates to detection of downlink radio link problems.

BACKGROUND

Radio link monitoring is vital to maintain radio connections in cellular systems. By regularly reporting the radio conditions to the system different types of actions can be taken when radio link failure occur.

In UTRA, the physical layers estimate the quality of the radio links and reports on radio frame basis to higher layers the synchronization status via so called synchronization primitives, as described at 3GPP TS 25.214 V7.4.0 "Physical layer procedures (FDD)".

Reporting radio link quality status will also be needed in E-UTRA, in which a fast and reliable detection of radio problems would be beneficial in order to avoid unnecessary interference in uplink, waste of resources in downlink and unnecessarily long delays before cell reselection or handover can take place.

Radio Link Failure Handling in E-UTRA

Figure 1:
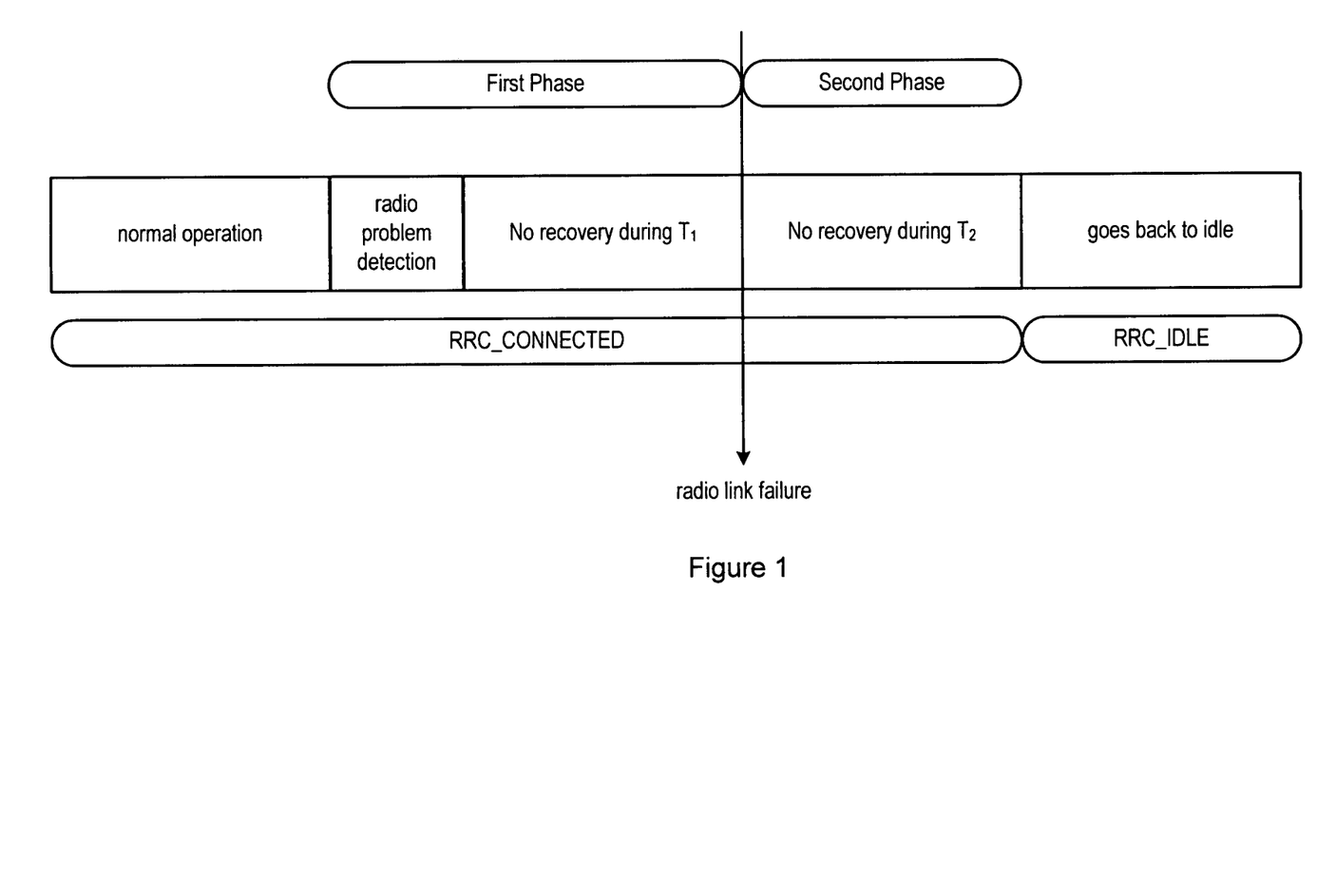
FIG. 1 illustrates radio link failure handling in E-UTRA.

The handling of radio link failure in E-UTRA is described in 3GPP TS 36.300 V8.1.0 "Overall description; stage 2" and consists of two phases as illustrated in FIG. 1, briefly described as First Phase:
  It is started upon radio problem detection which may lead to radio link failure detection after e.g. that a timer period has expired (T1)
  Network based mobility handling
Second Phase:
  It is started upon radio link failure detection which may lead to RRC state transition from CONNECTED to IDLE after timer (T2)
  UE-based mobility handling The judgment of "radio problem detection", as well as procedures for its reporting, is handled by the physical layer. The analogy with UTRA refers to the use of the synchronization primitives, e.g. the "out-of-sync" handling, which is further discussed below.

Radio Problem Detection in UTRA

In UTRA, fast transmit power control (TPC) is crucial for the system to operate properly. In downlink for example, TPC commands are sent continuously or periodically via the physical control channel (F-)DPCH or DPCCH. The UE measures the quality of this physical control channel over a pre-specified time interval and if the quality is below a specified threshold, the UE reports "out-of-sync" to the network. Error detection through cyclic redundancy check (CRC) is provided to transport blocks mapped to DPDCH. In addition to monitoring the control channel quality, the UE also monitors the number of consecutive CRC failures and if it is above a pre-specified number the UE reports out-of-synch to the network.

Packet Data Transmission in E-UTRA

E-UTRA is a pure packet data designed cellular system, in which transmissions of user data in uplink and downlink always take place via shared channels. Orthogonal Frequency Division Multiple (OFDM) technology is used in the downlink, whereas DFT based pre-coded OFDM is used in uplink. As similar to HSPA in UTRA, the UE monitors physical downlink control channels (PDCCH) in order to access UE dedicated user data on the physical downlink shared channel (PDSCH) and the network assign uplink scheduling grants to the UE on demand basis for uplink transmission via the physical uplink control channel (PUCCH) and the physical uplink shared channel (PUSCH). Error detection is provided on transport blocks and control payloads through CRC, and HARQ operations ensure efficient re-transmissions.

In E-UTRA, no downlink transmit power control (TPC) has been specified and uplink TPC commands are embedded in the control payload mapped to PDCCH, which are sent occasionally by the E-UTRA base station (eNodeB). Thus, no continuous or periodic dedicated physical channels such as (F-)DPCH and DPCCH are present as in UTRA.

Downlink Physical Signals and Channels in E-UTRA

The physical layer signals and channels in E-UTRA downlink are:
  Physical layer signals, i.e. reference signal (pilots) and synchronization signals
  Physical broadcast channel (PBCH)
  PDCCH and PDSCH
  Physical control format indicator channel (PCFICH)
  Physical HARQ indicator channel (PHICH)
Following observations can be done:
  Physical layer signals and PBCH are transmitted periodically
  Error detection via CRC of transport blocks mapped to PBCH and PDSCH, and of control data mapped to PDCCH
  Some uplink transmissions shall result in downlink responses through the physical channels PDCCH and PHICH An advantage of considering periodically transmitted signals and channels that is that the reporting instants of radio problem detection to higher layers then can be known in advance. Using shared channels for monitoring the radio link quality in E-UTRA may lead to an unpredictable reporting delay due to absence of scheduled data.

Radio Problem Detection in E-UTRA Downlink

For E-UTRA downlink operations, it seems natural to characterize radio problem detection as a UE not able to detect PDCCH and/or PDSCH under a certain time period. Besides not being able to receive any user data, consecutive CRC failures of the control data would also imply that the UE cannot receive any uplink scheduling grants as well as not respond to uplink TPC and time alignment (TA) commands, which are vital for the system to operate properly.

However, for the PDCCH the UE ID is implicitly encoded into the CRC which implies that a CRC failure may not be due to bad radio link conditions, i.e. the packet was aimed for another UE. For that reasoning, judge radio problem detection on e.g. high number of consecutive CRC failures of control data mapped to PDCCH appears to be less useful.

Checking the CRC of transport blocks mapped to PDSCH could be one possibility to monitor radio problem detection. Although demodulation of PDSCH requires that the associated PDCCH was correctly detected, the PDCCH should be significantly more robust than PDSCH. In this case, the rate adaptation has resulted in lowest possible user data bit rates but still the UE responds with consecutive NACKs to eNodeB. However, a potential drawback to base radio problem detection only on e.g. a high number of consecutive CRC failures of transport blocks of PDSCH is that the absence of scheduled data will lead to an unpredictable and possibly very long reporting delay.

In E-UTRA, the common reference signals are sent periodically and are distributed over the whole system bandwidth. Monitoring some quality metric such as e.g. SIR or pilot symbol error rates of the reference signals and report radio problem detection when quality metric is above a certain threshold could be an alternative or an addition to the above PDSCH CRC checks. However, bad quality of the common reference signals does not necessarily reflect the perceived quality of downlink physical channels PDCCH and PDSCH. Additionally, a quality metric can also be associated with synchronization signals such as e.g. the correlations between receive synchronization signal and considered primary synchronization signal are below a certain threshold.

Error detection through CRC is also provided on transport blocks mapped to the PBCH, which (in contrast to transport blocks mapped to the shared channels) are sent periodically and thus will have a predictable reporting delay. Thus, consecutive failures to read the physical broadcast channel could be used for indicating radio problem detection. However, the quality of the common physical channel PBCH does not necessarily reflect the perceived quality of PDCCH and PDSCH.

The eNodeB will regularly, but not necessarily periodically, transmit uplink TPC commands that are addressed to a group of UEs. If a UE that belongs to a certain group has not detected such commands within a specified time interval, it could report radio problem detection to higher layers. The same concept is also applicable to other control formats that e.g. include time alignment commands, although these commands are sent in-band and are sent less frequently than the e.g. uplink TPC commands.

The eNodeB will regularly, but not necessarily periodically, transmit PCFICH which contains information on how many consecutive OFDM symbols of PDCCH that are sent within a sub-frame. There will be three known sequences of 32 bits sent via PCFICH to indicate either 1, or 2 or 3 OFDM symbols. As a quality metric of PCFICH, a UE can evaluate bit errors of the received sequences during a certain time interval and report radio problem detection when high number of consecutive bit errors exceeds a certain threshold.

Discontinuous Reception (DRX) in Connected Mode

The E-UTRA downlink also allows the possibility of discontinuous reception (DRX) in RRC_CONNECTED mode (or LTE_ACTIVE mode as commonly called). This permits UE to save its battery while stay connected since it would be required to wake up only at periodic instances according to the DRX cycle. The network can configure a DRX cycle between 2 ms and up to 2.56 seconds depending upon the type of service e.g. typically 2 or 4 ms for real time services such as voice over IP and 1.28 seconds for non-real time services such as browsing the Internet. During DRX the UE may temporarily go into continuous reception mode when the network is sending data. After the data reception the UE reverts to the normal DRX mode after a timeout configured by the network.

The UE will try to stay inactive as much as possible during the silent periods of the DRX cycle to achieve maximum possible saving of its battery. But this also implies that UE will mainly perform measurements at the wake up instances for mobility, radio link problem detection (out-of-sync detection, in-sync detection) etc. Due to insufficient measurement opportunities in DRX mode (depending upon the DRX cycle) the UE would be unable to promptly detect the radio link problem.

It is likely that a very large number of UE are kept in DRX mode. Secondly in DRX mode the network for transmitting data can abruptly switch the UE into continuous reception mode. The UE should therefore stay well connected in terms of radio link quality and so any radio link problem should be reported to the network promptly. Thus, the radio link problem detection should be designed to work effectively in both DRX and non DRX modes of operations.

SUMMARY

Teachings herein advantageously enable the UE to obtain an adequate number of measurement samples needed for radio problem detection.

One possibility would be to use a plurality of physical channels for the detection of radio link problem. This approach is particularly attractive in E-UTRA where due to packet mode transmission and frequent use of DRX mode the sampling of multiple physical channels could more easily and quickly enable the UE to obtain adequate number of samples needed for radio link detection.

The concept of using combined channels (e.g. SCH, BCH, shared channel and pilot channels) has been proposed earlier. However, in the previously proposed methodology the idea is that two or more combination of these channels is always used by the UE for radio link detection. However, due to packet mode and especially due to DRX it may not always be possible for the UE to sample any combination of the channels all the time.

According to one embodiment of the present invention, there is provided a method, for use in a user equipment in a cellular telecommunication system having a plurality of downlink physical channels, the method comprising:
detecting radio link problems using a subset of said physical channels,
wherein said subset is dynamically adjusted depending upon which channels are available at a particular instant.

Embodiments of the present invention use a combination of several physical channels for radio link detection. The sub-set of the channels used by the UE are adjusted dynamically depending upon which channels are available at a particular measurement instance. The smallest sub-set would comprise of at least one physical channel. This method would speed up the detection of radio link problems especially in DRX. Thus, embodiments of the invention provide a possibility to use different combinations of several physical channels and different weights on each of the physical channel for detection of radio link problems. The condition for defining an error event for each channel can be set in one or more of the following ways: configured by the network, a standardized value, based on UE implementation or combination thereof.

The invention provides

Fast and reliable radio problem detection in downlink despite the lack of downlink dedicated channel due to packet mode transmission.

Reduced interference in uplink since when the UE notes detection of radio problem, it will e.g. stop transmitting measuring reports or other data in the uplink.

Limited waste of resources in downlink. Provided the base station receives information on bad downlink radio link it can remove the UE from the scheduling list.

Shorter handover delay. Provided the base station receives information on bad downlink radio link, serving base station may be altered more quickly if downlink problems are identified rapidly.

Fast detection of radio link problem in DRX operation and in scenario with limited measurement opportunities.

DETAILED DESCRIPTION OF PREFERRED EMBODIMENTS

Figure 2:
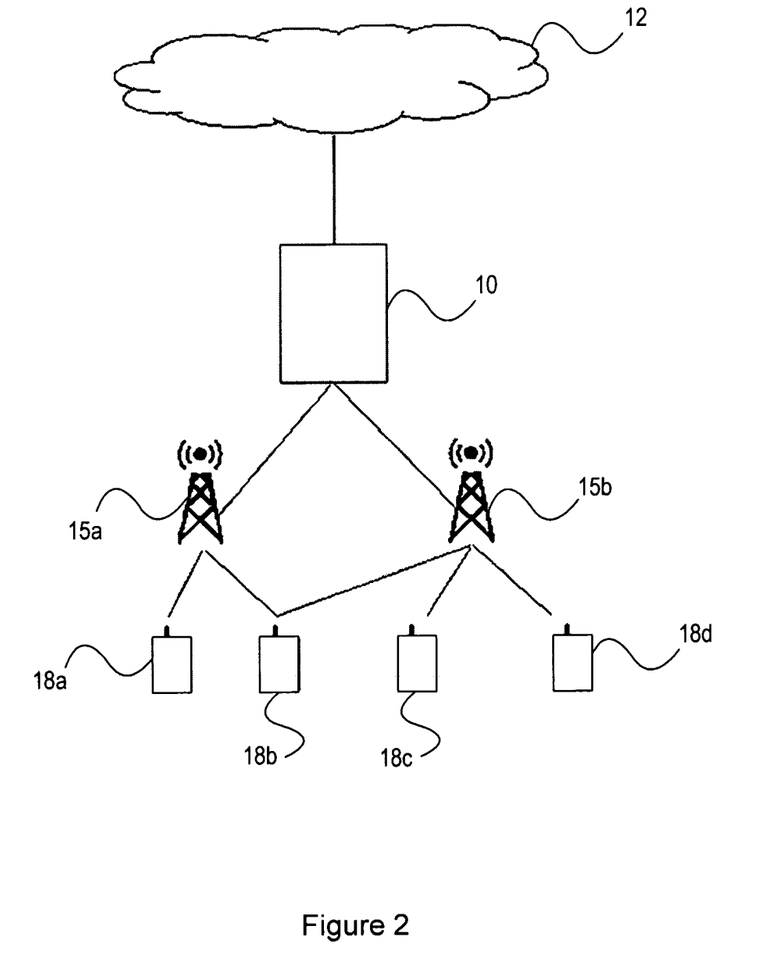
FIG. 2 shows an example of a communication network architecture.

FIG. 2 depicts a communication system, such as a OFDM system or a WCDMA system, including a Radio Access Network (RAN), such as the evolved UMTS Terrestrial Radio Access Network (E-UTRAN) architecture, comprising at least one Radio Base Station (RBS) (or Node B) 15a-b, connected to one or more Radio Network Controllers (RNCs) 10 (only one shown in FIG. 2). The RAN is connected over an interface such as the Iu-interface to a Core network (CN) 12, which may be a connection-oriented external CN such as the Public Switched Telephone Network 10 (PSTN) or the Integrated Services Digital Network (ISDN), and/or a connectionless external CN as the Internet.

The RAN and the CN 12 provide communication and control for a plurality of user equipments (UE) 18a-d. The UEs 18 each uses downlink (DL) channels (i.e. base-to-user or forward) and uplink (UL) channels (i.e. user-to-base or reverse) to communicate with at least one RBS 15 over a radio or air interface.

According to a preferred embodiment of the present invention, the communication system is herein described as a WCDMA communication system. The skilled person, however, realizes that the inventive method and arrangement works very well on all communications system. The user equipments 18 may be mobile stations such as mobile telephones ("cellular" telephones) and laptops with mobile termination and thus may be, for example, portable, pocket, hand-held, computer-included or car-mounted mobile devices which communicate voice and/or data with the RAN.

Physical Channels for Radio Link Problem Detection

In the preferred embodiment the downlink radio problem detection shall be based on monitoring quality metrics on the downlink signals. Radio problem detection can be declared when one or several of the quality metrics exceed or fall below one or several thresholds within predefined time intervals. The set of error events to be used may be UE specific or specific to a group of UEs. The specific combination of parameters and different weights to be used for each of the physical channel may be signaled by the eNodeB to the UE e.g. dependent on the type of traffic and the traffic load. In one embodiment the conditions to be used are semi-static whereby the set of parameters to be used and the weightings are signaled via higher layer signaling. Alternatively a number of standard combinations are defined such that the eNodeB may signal a reference to such standard combination. This will reduce the number of bits that needs to be transmitted. In yet another embodiment, the UE has a number of pre-defined alternative combinations set by a standard to apply dependent on the reception mode that is used, e.g. one specific combination for DRX mode etc.

Figure 3:
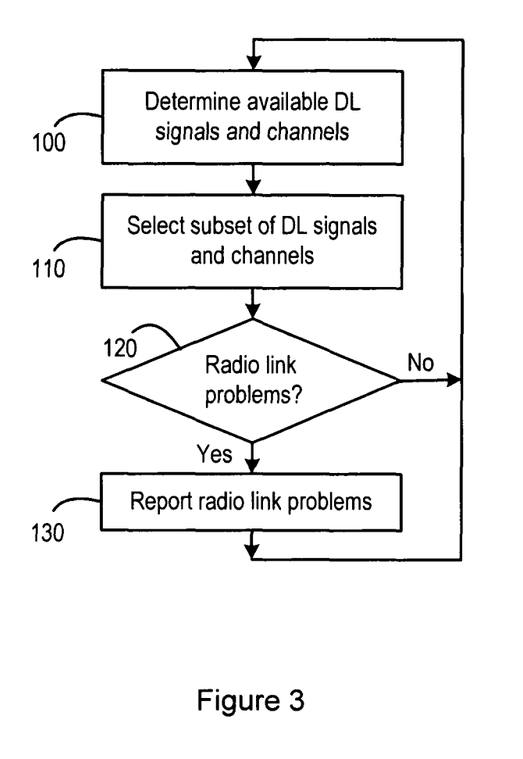
FIG. 3 is a flow chart, illustrating a method in accordance with a first aspect of the present invention.

The potential candidates for downlink radio quality detection can be:
  Monitoring a downlink reference signal quality metric
    E.g., the downlink reference signal quality metric can be the received SIR, or pilot symbol error rate, of the reference signals transmitted depending on the antenna configuration, e.g. reference signals 0 in case of one eNodeB antenna port.
  Monitoring a synchronization signal quality metric
    E.g., the quality metric can be correlation values between received signals and considered primary synchronization signal.
  Monitoring a PBCH quality metric
    E.g., the PBCH quality metric can be the number of consecutive PBCH CRC failures
  Monitoring a PDSCH quality metric,
    E.g., the PDSCH quality metric can be the number of consecutive PDSCH CRC failures or the number of cases where the number of HARQ retransmissions exceeds the targeted number of HARQ retransmissions.
  Monitoring a time between correct detected PDCCH data referring to E-UTRA control format with TPC commands to multiple users
    E.g., the PDCCH quality metric can be the number of absent received radio frames
  Monitoring a PCFICH quality metric
    E.g., the PCFICH quality metric can be bit errors or quality of soft values.
  Monitoring PHICH channel
    E.g., the PHICH quality metric can be the quality of the soft bits Radio Link Detection Algorithm Based on Combined Channels FIG. 3 is a flow chart, illustrating a method in accordance with an aspect of the invention.

In step 100, the user equipment determines which of said downlink (DL) physical signals and channels are available. In step 110, the user equipment dynamically selects a subset of said downlink physical signals and channels based on the result of determining in step 100 which of said downlink physical signals and channels are available. In step 120, the user equipment detects whether there are radio link problems using the selected subset of said downlink physical signals and channels. The details of this determination are set out below. If so, in step 130, the user equipment reports the radio link problems to the radio base station but, if not, the process returns to step 100.

As stated above it may not always be possible for the UE due to DRX or lack of scheduling to obtain sufficient number of measurement samples in a stipulated time for detecting radio link problem. But to expedite the detection process several physical channels can be sampled in a dynamic fashion as described below:

Let's assume there are M physical channels (e.g. PBCH, PDSCH, SCH etc), which can potentially be used by the UE for the detection of radio link problems. Then the radio link failure condition is detected if at least X % ($0 \leq X \leq 100$) of the aggregate number of consecutive measurement events (or samples) of different physical channels are erroneous and exceeds or becomes equal to certain threshold ($K_1$).

The error event for a particular channel would depend upon the type of channel. For instance it can be declared when the quality of a channel goes below the desired threshold (SNR, BER etc) or if CRC failure occurs. Secondly the error event detection is based on mainly single measurement sample of a particular channel, e.g. SCH SNR measured over a single OFDMA symbol or PBCH CRC failure over a single transport block etc. The condition for defining an error event for each channel can be set one or more of the following ways: configured by the network, a standardized value, based on UE implementation or combination thereof.

The aggregate number is obtained by defining a suitable function. A general formula is expressed in (1):

$$F\{\alpha_1 N_{error\_event}^{ch\_1}, \alpha_2 N_{error\_event}^{ch\_2}, \ldots \alpha_M N_{error\_event}^{ch\_M}\} \geq K_1 \qquad (1)$$

A special case of (1) could be expressed in terms of the weighted linear sum of the error events of all physical channels, i.e. expressed by (2):

$$\alpha_1 N_{error\_event}^{ch\_1} + \alpha_2 N_{error\_event}^{ch\_2} + \ldots + \alpha_M N_{error\_event}^{ch\_M} \geq K_1 \quad (2)$$

In case of equal weight for each i.e. if $\alpha_1 = \alpha_2 = \ldots = \alpha_M = 1$, then (3) is obtained:

$$N_{error\_event}^{ch\_1} + N_{error\_event}^{ch\_2} + \ldots + N_{error\_event}^{ch\_M} \geq K_1 \quad (3)$$

This approach gives UE some flexibility in acquiring sufficient number of measurement samples in shortest possible time. During wake up instances of the DRX cycle, at one occasion the UE could measure only reference symbol BER for radio link detection. At another instance it can measure SCH BER (or SNR) and reference symbol BER. Similarly at another instance it can check the PBCH CRC and so on. This type of limitation stems from the fact that UE also has to perform regular neighbor cell identification and measurements. The limited measurement capability coupled with the DRX operation put further restraints on the UE in terms of sampling more often and more channels from the serving cell for detecting radio link problem.

However the situation may also happen when UE is able to measure several physical channels simultaneously in a very short time. But this type of detection should not be performed over too short period. Thus a minimum time period could also be specified over which the detection should be performed even if the aggregated number of error events exceed the limit ($K_1$) expressed in (1).

A problematic radio link may also recover. Thus, UE should also be able to detect this recovery or improvement. In this case at least there should be sufficient number of correct events exceeding certain threshold ($K_2$) as expressed in (4). The correct events are also obtained from multiple channels depending upon their availability, the UE measurement capability, DRX cycle etc.

$$F\{\beta_1 N_{correct\_event}^{ch\_1}, \beta_2 N_{correct\_event}^{ch\_2}, \ldots, \beta_M N_{correct\_event}^{ch\_M}\} \geq K_2 \quad (4)$$

A special case of (4) could be expressed in terms of the weighted linear sum of the correct events of all physical channels, i.e. expressed by (5):

$$\beta_1 N_{correct\_event}^{ch\_1} + \beta_2 N_{correct\_event}^{ch\_2} + \ldots + \beta_M N_{correct\_event}^{ch\_M} \geq K_2 \quad (5)$$

Radio Link Detection Algorithm Based on Timing Uncertainty

Figure 4:
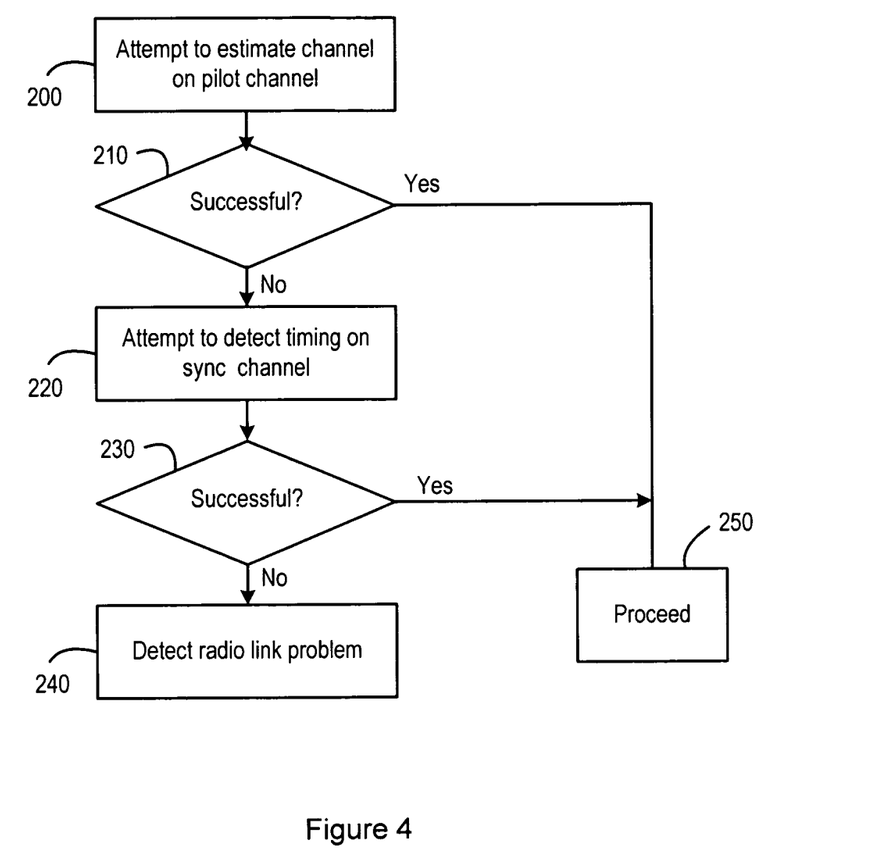
FIG. 4 is a flow chart, illustrating a method in accordance with a second aspect of the present invention.

FIG. 4 is a flow chart, illustrating an alternative method in accordance with the invention. In step 200, the user equipment attempts to estimate the channel on the pilot channel and in step 210 it determines whether this attempt was successful. If the user equipment is unable to properly estimate the channel on the pilot channel to within a predetermined threshold over a predetermined time period, the process passes to step 220, in which the user equipment attempts to detect a timing of transmissions on the synchronization channels. In step 230 it determines whether this attempt was successful. If the user equipment is unable to detect the timing of transmissions on the synchronization channels within a predetermined threshold over a predetermined time period, the process passes to step 240, and the user equipment determines that there is a radio link problem. If the user equipment is able to detect the timing correctly, either at step 210 or step 230, the process can pass to step 250, and proceed normally.

Thus, the radio link can be regarded as problematic if UE is unable to detect the timing (e.g. frame boundary) with certain precision (e.g. with timing accuracy of $\pm T_0$ µs) over a certain time period or after certain number of successive synchronization attempts. The timing can be lost due to bad radio link. Another reason could be the drift at the base station transmit timing. Thus, the timing uncertainty needs to be re-checked by again performing the correlation over the serving SCH channel (more specifically the Primary SCH as it gives frame timing) at regular intervals or when quality of any other channel deteriorates. The radio link could be considered bad if the output of correlation (e.g. SNR) stays below certain threshold over an uncertainly range (e.g. $\pm T_0$ µs). The evaluation process should not be too complex since UE already knows the SCH sequences (i.e. P-SCH and S-SCH) of the serving cell and it often checks the timing of the cell. A minimum period for evaluating radio link detection could be useful to prevent the affect of fast fading. For instance the output of the correlation detector may occasionally lead to unexpected pessimistic results due to fading.

A problematic radio link may also recover. Thus, UE should also be able to detect this recovering. This could also be traced if UE is able to detect the frame timing by performing correlation over the SCH. Thus, radio link could be regarded as suitable if UE is able to recover the timing within certain accuracy (e.g. $\pm T_0$ µs).

A third method could be based on the combination of methods based on combined channels and timing uncertainty described in the foregoing. They can either be carried out in parallel or in tandem. In one embodiment the radio link can be considered bad if at least one of the conditions is fulfilled. In another embodiment both conditions have to be fulfilled before the radio link is considered bad.

The invention claimed is:

1. A method implemented by a user equipment in a cellular telecommunication system having a plurality of downlink physical channels, the method comprising:
   detecting radio link problems using a subset of two or more of said physical channels, by detecting a radio link problem when a number of error events aggregated across the physical channels in said subset exceeds a threshold; and
   wherein said subset is dynamically adjustable depending upon which channels are available at a particular instant.

2. The method of claim 1, further comprising dynamically adjusting the subset of physical channels used for radio link problem detection from one discontinuous reception wake-up instance to another.

3. The method of claim 1, wherein the number of error events comprises a sum of a number of error events across the physical channels in said subset.

4. The method of claim 3, wherein said sum of the number of error events is a weighted linear sum.

5. The method of claim 1, further comprising detecting an error event on a channel when a quality of that channel falls below a threshold value.

6. The method of claim 5, wherein said quality is measured over a symbol.

7. The method of claim 1, further comprising detecting an error event on a channel when a CRC failure occurs.

8. The method of claim 1, further comprising:
   detecting a radio link improvement using said subset.

9. The method of claim 8, wherein detecting a radio link improvement comprises detecting a radio link improvement when a number of correct events aggregated across the physical channels in said subset exceeds a threshold.

10. The method of claim 9, wherein the number of correct events comprises a sum of a number of correct events ca across the physical channels in said subset.

11. The method of 10, wherein said sum of the number of correct events is a weighted linear sum.

12. A method implemented by a user equipment in a cellular telecommunication system having a plurality of downlink physical signals and channels, the method comprising:
- determining which of said downlink physical signals and channels are available;
- dynamically selecting a subset of two or more of said downlink physical signals and channels based on determining which of said downlink physical signals and channels are available and which can best be used for radio link problem detection at a given time; and
- detecting radio link problems using the selected subset, by detecting a radio link problem when a sum of a number of error events across the physical signals, channels, or both in the subset exceeds a threshold.

13. The method of claim 12, further comprising dynamically adjusting the subset of downlink physical signals and channels used for radio link problem detection from one discontinuous reception wake-up instance to another.

14. The method of claim 12, wherein said sum of the number of error events is a weighted sum.

15. The method of claim 12, further comprising detecting an error event on a channel when a quality of the channel falls below a threshold value.

16. The method of claim 15, wherein said quality is measured over a symbol.

17. The method of claim 12, further comprising detecting an error event on a channel when a CRC failure occurs.

18. The method of claim 12, further comprising reporting detected radio link problems to a radio base station.

19. A user equipment in a cellular telecommunication system having a plurality of downlink physical signals and channels, the user equipment configured to:
- determine which of said downlink physical signals and channels are available;
- dynamically select a subset of two or more of said downlink physical signals and channels based on determining which of said downlink physical signals and channels are available; and
- detect radio link problems using the selected subset, by detecting a radio link problem when a sum of a number of error events en across the physical signals, channels, or both in the subset exceeds a threshold.

* * * * *

UNITED STATES PATENT AND TRADEMARK OFFICE
CERTIFICATE OF CORRECTION

PATENT NO. : 8,639,241 B2
APPLICATION NO. : 12/680272
DATED : January 28, 2014
INVENTOR(S) : Lindbom et al.

Page 1 of 1

It is certified that error appears in the above-identified patent and that said Letters Patent is hereby corrected as shown below:

In the Claims

In Column 8, Line 66, in Claim 10, delete "events ca" and insert -- events --, therefor.

In Column 9, Line 1, in Claim 11, delete "of 10," and insert -- of claim 10, --, therefor.

In Column 10, Line 21, in Claim 19, delete "events en" and insert -- events --, therefor.

Signed and Sealed this
Eleventh Day of November, 2014

Michelle K. Lee
*Deputy Director of the United States Patent and Trademark Office*